United States Patent [19]

Kimura

[11] Patent Number: 5,818,060
[45] Date of Patent: Oct. 6, 1998

[54] APPARATUS FOR SHIELDING AGAINST CHARGED PARTICLES

[75] Inventor: Tsunekazu Kimura, Tokyo, Japan

[73] Assignee: NEC Corporation, Tokyo, Japan

[21] Appl. No.: 990,570

[22] Filed: Dec. 12, 1997

[30] Foreign Application Priority Data

Dec. 13, 1996 [JP] Japan .................................... 8-334201

[51] Int. Cl.$^6$ .................................................. B64G 1/54
[52] U.S. Cl. .................................... 250/515.1; 250/505.1
[58] Field of Search ............................. 250/515.1, 505.1; 174/35 R; 257/941

[56] References Cited

U.S. PATENT DOCUMENTS 5,270,551  12/1993  Kamimura et al. ................... 250/515.1

*Primary Examiner*—Kiet T. Nguyen
*Attorney, Agent, or Firm*—Scully, Scott, Murphy & Presser

[57] ABSTRACT

An apparatus for shielding against charged particles enables the performance of electronic equipment to be fully exerted and the manufacturing cost thereof to be reduced; it also permits a wide range of applications. In the apparatus for shielding against charged particles, an equipment cabinet (12) which includes electronic circuits is constructed by an electronic cabinet having a shielding layer (13) for blocking charged particles coming from outside the equipment cabinet (12) into the equipment cabinet (12). A capacitor (18) for generating an electric field (L) directed from inside the equipment cabinet (12) to outside the equipment cabinet (12) is embedded in the shielding layer (13) of the equipment cabinet (12).

4 Claims, 1 Drawing Sheet

14 OBSERVATION EQUIPMENT

CABINET INSIDE

CABINET OUTSIDE

APPARATUS FOR SHIELDING AGAINST CHARGED PARTICLES

BACKGROUND OF THE INVENTION

1. Field of the Invention

The present invention relates to an apparatus for shielding against charged particles, which apparatus is aboard a rocket for launching a satellite, an artificial satellite, a space station, a space shuttle, or the like.

2. Description of the Related Art

In recent years, there has been a problem of the influences of cosmic radiation on LSIs and the like in the electronic equipment used in a space environment or the electronic equipment used in the vicinity of a charged particle accelerator or radiological equipment. Especially in the case of low-orbit space electronic equipment, it has been known that the entry of the protons present in the Van Allen belt and the heavy particles of galactic cosmic rays into electronic equipment causes latchups or soft errors of VLSIs.

On the ground also, there has been a demand for measures against the malfunctions of electronic equipment employed in a similar radiation environment wherein many charged particles are emitted or present.

Hitherto, in response to the problem and demand mentioned above, the process and the device structure of VLSIs have been improved to develop or employ special radiation-resistant devices adapted to shield electronic equipment against radiation.

In a conventional structure for shielding against the entry of radiation, the circuitry in electronic equipment is covered by a metal plate of the highest specific gravity in the allowable range within the constraints of weight and volume.

The former electronic equipment, which employs the special radiation-resistant devices, however, requires that the sensitivity to the electric charges in the devices be set lower than that of the electronic equipment which has the same functions but employs consumer-oriented devices. This has been posing a problem in that the operating speed is sacrificed, the integration is deteriorated because of the addition of the special structure, or the power consumed is increased, thus preventing the performance of the electronic equipment to be fully exerted.

There has been another problem in that the electronic equipment employing the radiation-resistant devices requires significant investment and time for the development and design of the radiation-resistant devices due to the difficulty and the need of special considerations of the design thereof, resulting in high manufacturing cost.

In the latter electronic equipment, which employs the metal plate having a high specific gravity for the shielding structure, it is necessary to make the metal plate considerably thick. This is inconvenient for the electronic equipment to be aboard spacecraft which has a strict weight limit.

SUMMARY OF THE INVENTION

Accordingly, the present invention has been made in view of the prior art including the disadvantages and deficiencies thereof, and it is an object of the present invention to provide an apparatus for shielding against charged particles, which apparatus is capable of enabling the performance of electronic equipment to be fully exerted, reducing manufacturing cost, and allowing use thereof in a wide range of applications.

To this end, according to the present invention, there is provided an apparatus for shielding against charged particles in electronic equipment provided with an equipment cabinet incorporating an electronic circuit, wherein: the equipment cabinet is composed of an equipment cabinet having a shielding layer for shielding charged particles coming from outside the equipment cabinet into the equipment cabinet, a capacitor for generating an electric field directed from inside the equipment cabinet to outside the equipment cabinet being embedded in the shielding layer of the equipment cabinet.

Hence, the shielding layer prevents the charged particles coming from outside the equipment cabinet from entering the equipment cabinet. Further, even if the charged particles coming from outside the equipment cabinet enter the shielding layer, the incident energy thereof is attenuated through the shielding layer.

In a preferred form of the apparatus for shielding against charged particles according to the present invention, the shielding layer is attached to the equipment cabinet.

In another preferred form of the apparatus for shielding against charged particles according to the present invention, the equipment cabinet is constituted by the shielding layer.

In yet another preferred form of the apparatus for shielding against charged particles according to the present invention, the electronic equipment is composed of electronic equipment used in a space environment.

DESCRIPTION OF THE PREFERRED EMBODIMENTS

Referring now to the accompanying drawings, the present invention will be explained in conjunction with embodiments.

Figure 1:
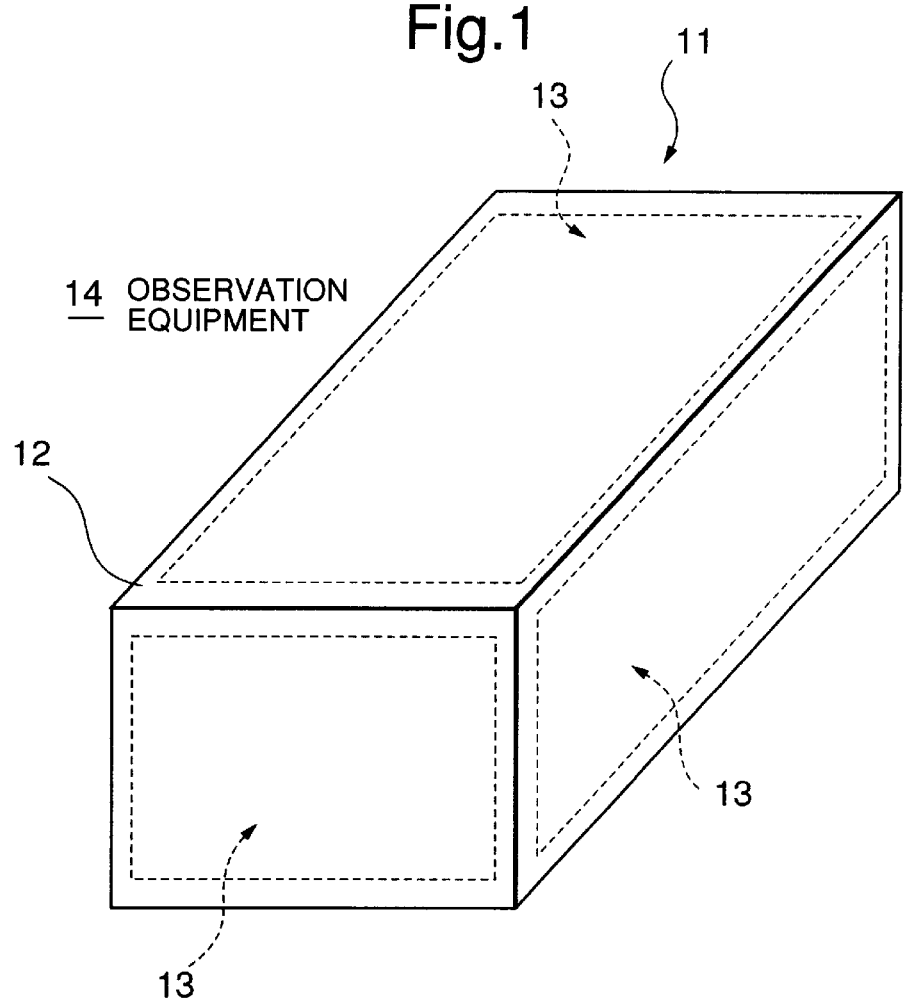
FIG. 1 is a perspective view showing an apparatus for shielding against charged particles in accordance with a first embodiment of the present invention.
Figure 2:
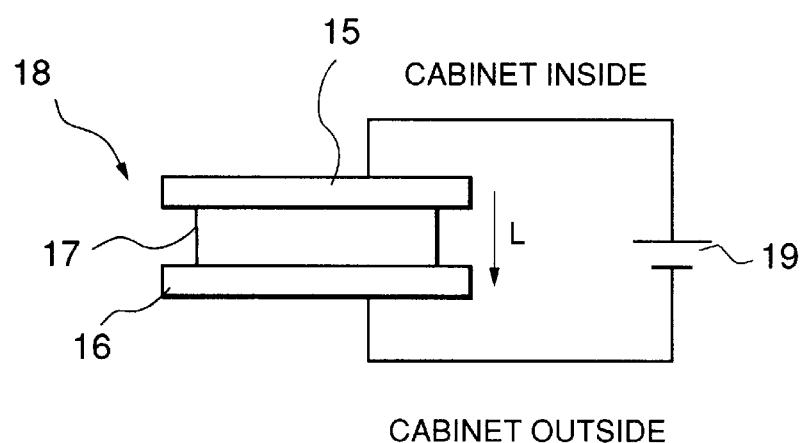
FIG. 2 is a circuit diagram showing a capacitor constituting a shielding layer.

FIG. 1 is a perspective view showing an apparatus for shielding against charged particles in accordance with a first embodiment of the present invention; and FIG. 2 is a circuit diagram showing a capacitor constituting a shielding layer.

In the drawings, an apparatus 11 for shielding against charged particles is equipped with an equipment cabinet 12 and shielding layers 13.

The equipment cabinet 12 is constructed by a square box composed of a hexahedron. The equipment cabinet 12 incorporates a plurality of circuit boards (not shown) constituting observation equipment 14 serving as the electronic equipment used in a space environment. Mounted on the circuit boards (not shown) are electronic circuits (not shown) which include semiconductor devices and other electronic components (not shown).

The shielding layer 13 is composed of a capacitor 18 having plates 15 and 16 and a dielectric 17, and aluminum reinforcing plates (not shown) which are placed on the plates 15 and 16 of the capacitor 18 via insulating layers (not shown). The shielding layer 13 is attached to each of the six inner surfaces of the equipment cabinet 12 or to the whole surface of the module wall of a subsystem in the equipment cabinet 12.

The plates 15 and 16 are composed of, for example, copper plates. These two plates 15 and 16 are positioned such that they are opposed to each other with a predetermined interval provided therebetween and are parallel to the inner surfaces of the equipment cabinet 12; the plates are connected to the positive electrode and the negative electrode, respectively, of a power supply (battery) 19 or a battery (not shown). The dielectric 17 is composed of a member having a high dielectric constant; it is placed between the two plates 15 and 16.

The capacitor 18 is embedded in the shielding layer 13. High voltage applied to the plates 15 and 16 from the power supply 19 causes the capacitor 18 to generate an electric field L which is directed from inside the equipment cabinet 12 to outside the equipment cabinet 12 and which is perpendicular to the inner surfaces of the equipment cabinet 12.

In the apparatus for shielding against charged particles, the electric field L generated by the capacitor 18 and the electric charges accumulated in the plates 15 and 16 shield the cosmic rays, namely, positively charged particles, coming from outside the equipment cabinet 12 into the equipment cabinet 12.

Moreover, even if cosmic rays coming from outside the equipment cabinet 12 enter the shielding layer 13, the energy thereof will be attenuated through the shielding layer 13.

Thus, in the first embodiment, consumer-oriented devices can be used for the electric-field shielding structure; hence, it is no longer necessary to set the sensitivity to the electric charges in the devices to a low level, the drop in the operating speed and the deterioration in the integration can be controlled, and the consumed power can be reduced.

Further, in the first embodiment, the use of the consumer-oriented devices for the electric-field shielding structure makes it possible to save investment and time required for the development and design of the shielding devices.

Furthermore, unlike the prior art, this embodiment does not shield against charged particles solely by metal plates; hence, the thickness of the equipment cabinet can be reduced.

In the first embodiment, the shielding layers are attached to the equipment cabinet; however, the present invention is not limited thereto. In a second embodiment, the equipment cabinet may be constituted by a shielding layer to shield against charged particles more effectively. If the equipment cabinet is a square box, then it is constructed by a square cylinder, which opens on both ends, and square plates which close both ends of the square cylinder.

In the first embodiment, an example where the present invention is applied to the electronic equipment used in the space environment; however, the invention is not limited thereto. In a third embodiment, the invention can be applied, in the same manner as in the first embodiment, to other types of electronic equipment used in the vicinity of a charged particle accelerator or radiological equipment.

Thus, according to the present invention, the equipment cabinet incorporating electric circuits is composed of an equipment cabinet having a shielding layer which shields against charged particles coming from outside the equipment cabinet into the equipment cabinet, and a capacitor for generating an electric field directed from inside the equipment cabinet to outside the equipment cabinet is embedded in the shielding layer of the equipment cabinet; hence, the entry of charged particles coming from outside the equipment cabinet into the equipment cabinet is blocked by the shielding layer. Moreover, even if the charged particles coming from outside the equipment cabinet enter the equipment cabinet, the incident energy thereof will be attenuated through the shielding layer.

Therefore, since consumer-oriented devices can be used for the electric-field shielding structure, it is no longer necessary to set the sensitivity to the electric charges in the devices to a low level, the drop in the operating speed and the deterioration in the integration can be controlled, and the consumed power can be reduced, enabling the electronic equipment to fully exert the performance thereof.

Furthermore, consumer-oriented devices can be used for the electric-field shielding structure to make it possible to save investment and time required for the development and design of the shielding devices. This permits reduced manufacturing cost.

In addition, unlike the prior art, the apparatus in accordance with the present invention does not shield against charged particles solely by metal plates; hence, the thickness of the equipment cabinet can be decreased. This enables the present invention to be used for an extensive range of applications including the electronic equipment aboard spacecraft.

What is claimed is:

1. An apparatus for shielding against charged particles in electronic equipment provided with an equipment cabinet incorporating an electronic circuit, wherein:

said equipment cabinet is composed of an equipment cabinet which has a shielding layer for shielding against charged particles coming from outside the equipment cabinet into the equipment cabinet; and a capacitor for generating an electric field directed from inside the equipment cabinet to outside the equipment cabinet is embedded in said shielding layer of the equipment cabinet.

2. An apparatus for shielding against charged particles according to claim 1, wherein said shielding layer is attached to said equipment cabinet.

3. An apparatus for shielding against charged particles according to claim 1, wherein said equipment cabinet is constituted by said shielding layer.

4. An apparatus for shielding against charged particles according to claim 1, wherein said electronic equipment is composed of electronic equipment used in a space environment.

* * * * *